United States Patent [19]
Beck et al.

[11] Patent Number: 6,102,423
[45] Date of Patent: Aug. 15, 2000

[54] VISUAL ALIGNMENT AID FOR CONNECTING TRAILERS

[76] Inventors: Howard S. Beck, 3830 Arlington St., Ft. Myers, Fla. 33901; Douglas M. Beck, 63 Becker Dr., North Ft. Myers, Fla. 33903

[21] Appl. No.: 09/059,008

[22] Filed: Apr. 13, 1998

[51] Int. Cl.[7] .................................................. B60D 13/00
[52] U.S. Cl. ........................ 280/477; 359/844; 52/785.2
[58] Field of Search ..................................... 248/467, 474, 248/476, 479, 495, 480; 359/841, 844, 871, 872, 881; 280/477, 432; 33/264; 52/785.1, 785.12

[56] References Cited

U.S. PATENT DOCUMENTS

| | | | |
|---|---|---|---|
| 4,905,376 | 3/1990 | Neeley | 33/264 |
| 5,478,101 | 12/1995 | Roberson | 280/477 |
| 5,784,213 | 7/1998 | Howard | 359/872 |

*Primary Examiner*—Chris Schwartz
*Assistant Examiner*—C. T. Bartz
*Attorney, Agent, or Firm*—Werner H. Schroeder

[57] ABSTRACT

The visual alignment aid for connecting the ball of the hitch on a towing vehicle to the socket on the tongue of the trailer is a device constructed of three components which are connected to each other by hinges. One of the components is a base component, a second one of the components has a convex mirror attached thereto and the third of the components has a means for attaching the device to the rear of a vehicle. All three components may assume an angulated position relative to each other and the vehicle to establish a correct line of vision between the driver and the ball and the socket. The three components can be arrested relative to each once a correct line of vision has been established. Color coding may be used on the arresting means to indicate the angulated positions. The same device could be used on a different type of vehicle and once a correct line of vision has been established for that different vehicle, a different color would be used to indicate the rotational positions. After the aid device has been used for its intended purpose, it may be collapsed into a flat configuration whereby two of the components are nestled within the base component.

12 Claims, 7 Drawing Sheets

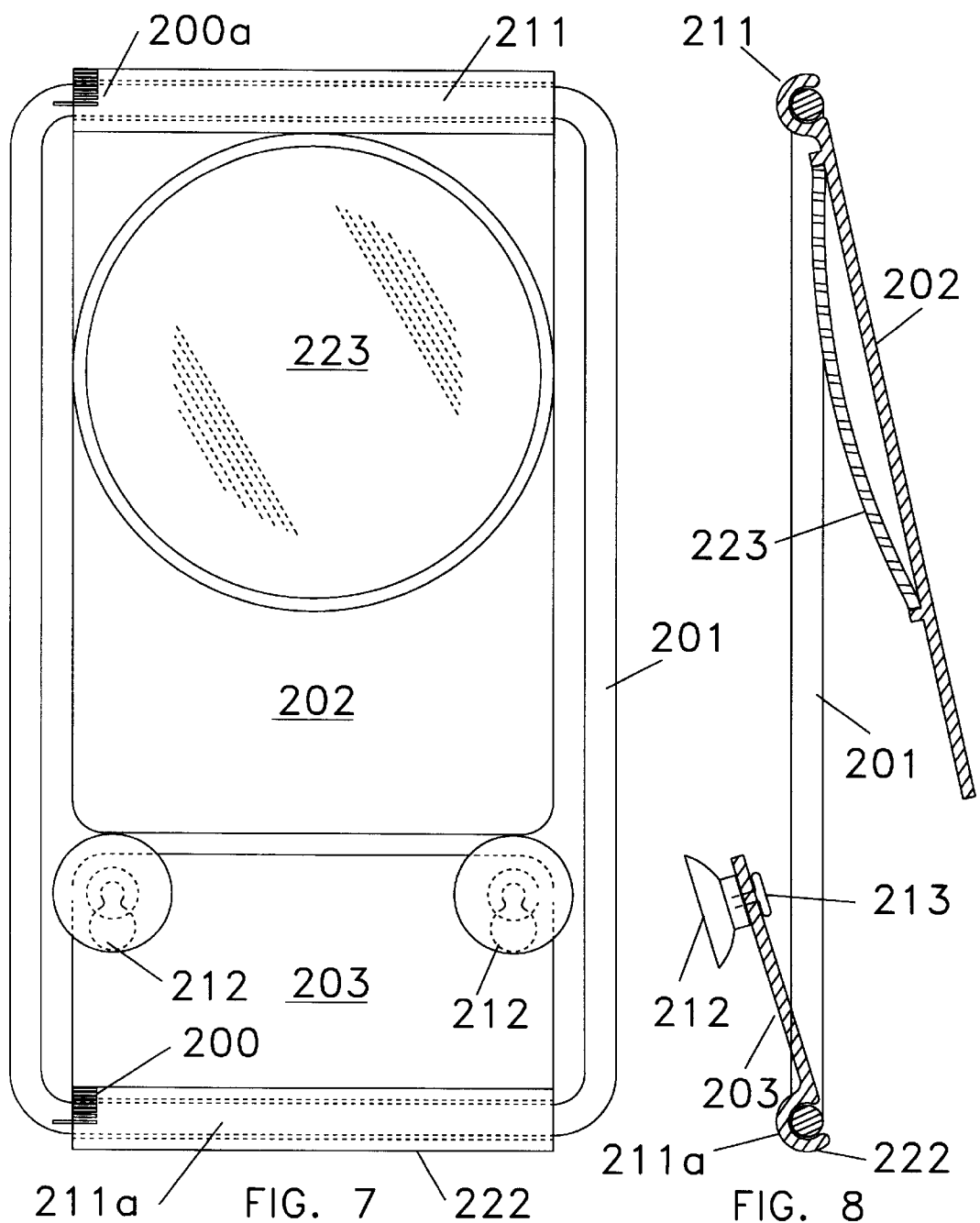

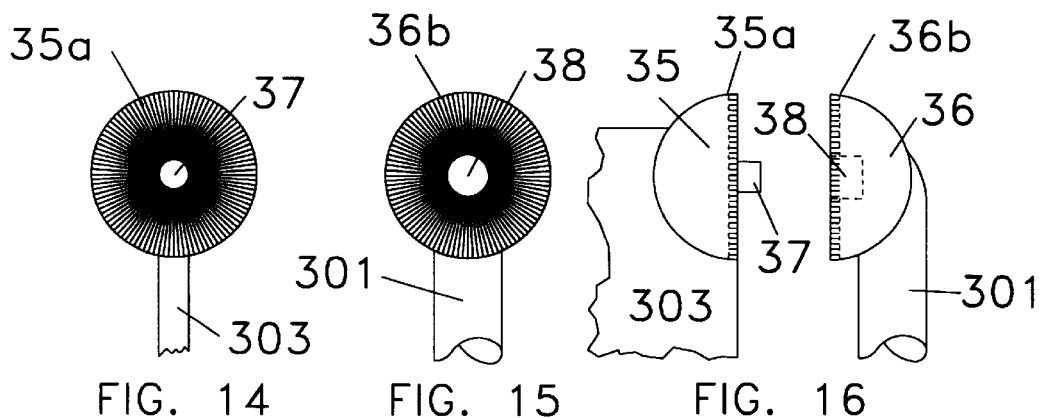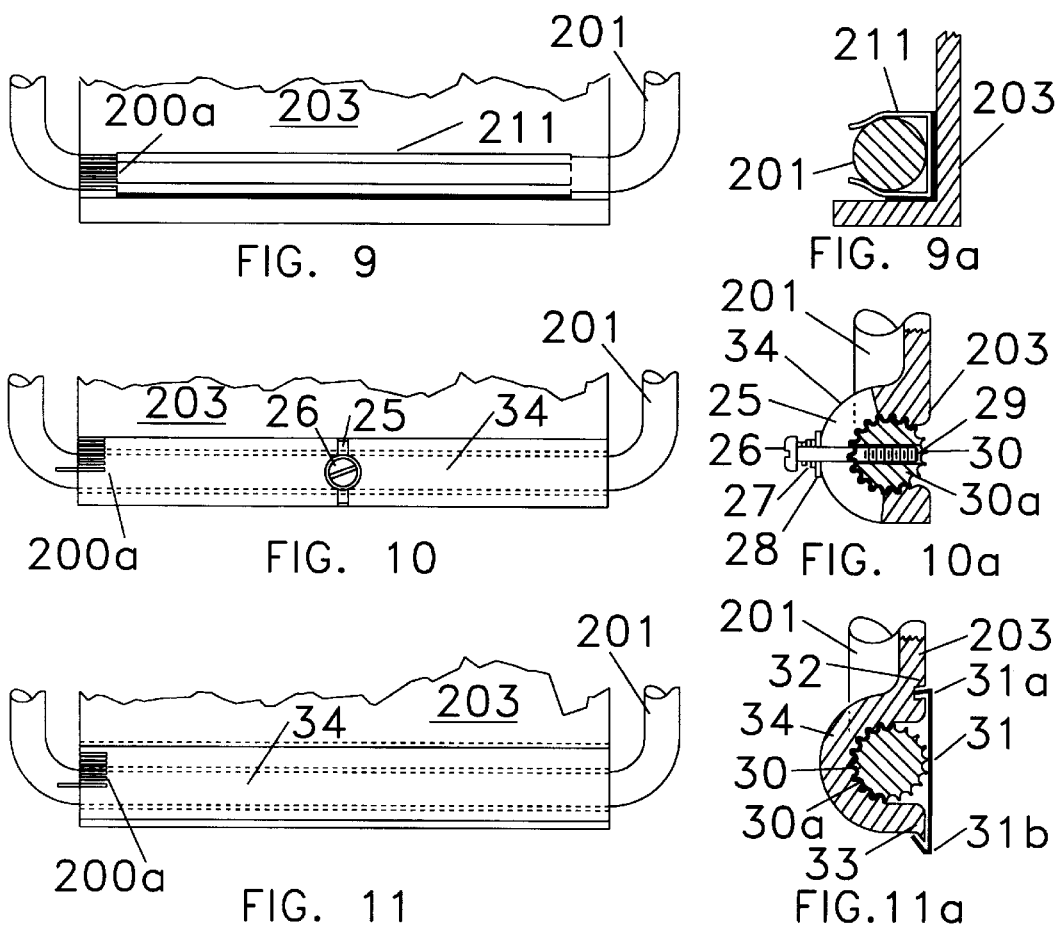

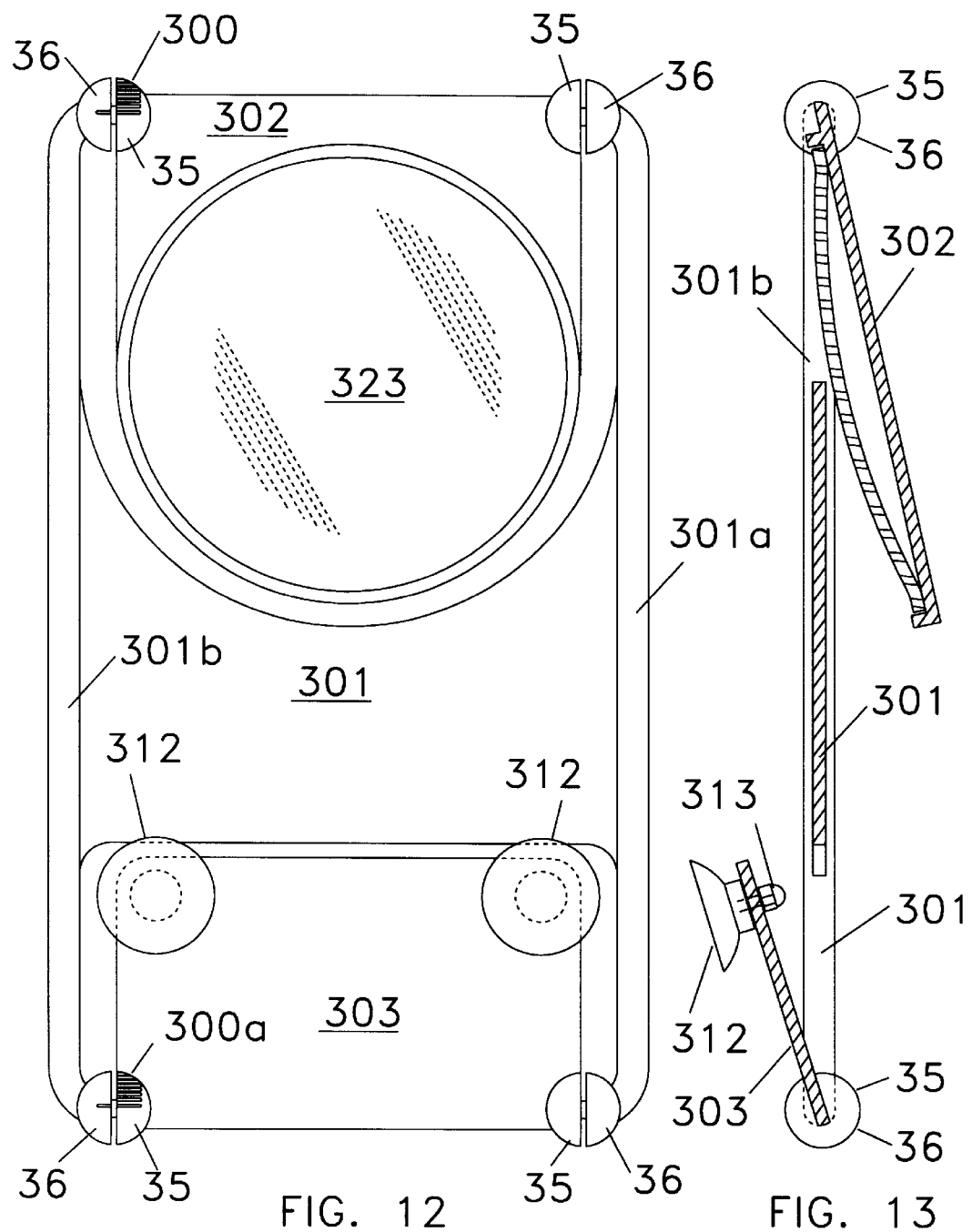

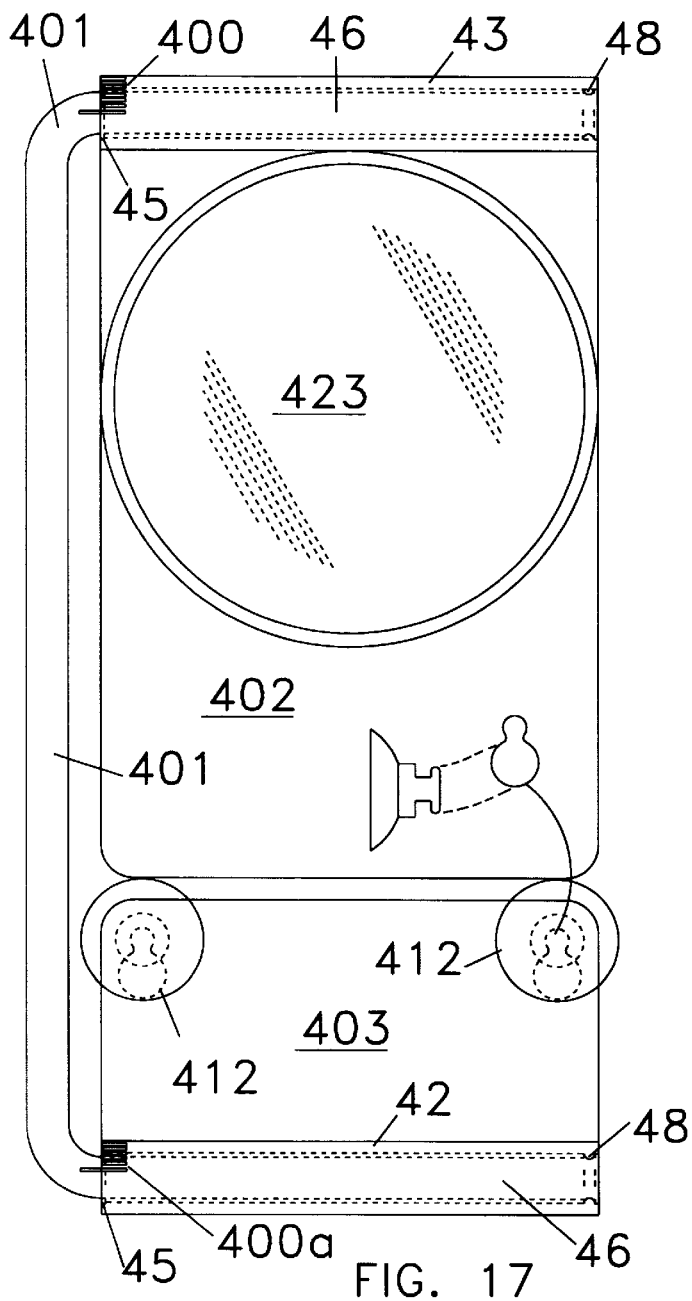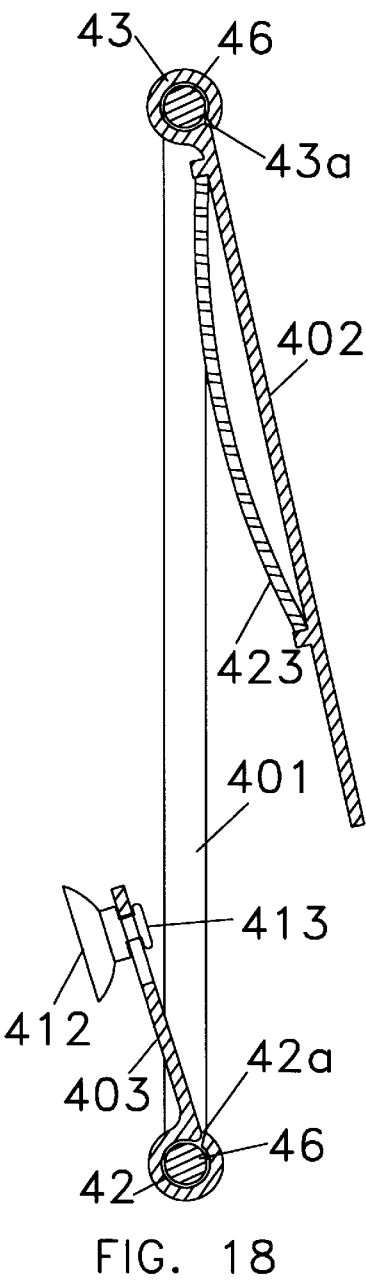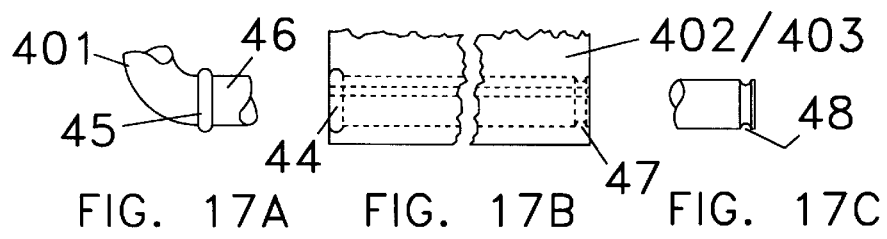
FIG. 17   FIG. 18
FIG. 17A   FIG. 17B   FIG. 17C

VISUAL ALIGNMENT AID FOR CONNECTING TRAILERS

1. FIELD OF THE INVENTION

The present invention involves a visual aid device for helping the driver of a towing vehicle in connecting a trailer, particularly a visual aid for helping in aligning the ball of the hitch of a towing vehicle relative to the socket on the tongue of the trailer by using an adjustable convex mirror on the adjustable device which is removably attached to the rear of the towing vehicle. The device can have a color coding thereon for convenient and repeated adjustments and can be folded into a compact configuration for easy handling and storage.

2. DESCRIPTION OF THE PRIOR ART

Various devices have been designed to facilitate connecting a towing vehicle to a trailer. Most of the devices involve a mirror and therefore, are considered to be visual aids permitting the driver a direct visual observation of the alignment of the ball of the hitch on the towing vehicle with the socket on the tongue of the trailer.

U.S. Pat. No. 5,180,182 discloses such a device. It consists of three parts which are hingedly connected together to each other at their respective edges. Two side parts are notched at their edges and support a convex mirror attached to the third part in a position which is normal to the line of vision of a person attempting to align the towing vehicle and the trailer. The notches are provided so that the assembled device can be mounted on the edge of the tail gate of a pickup truck. It also allows the trailer hitch alignment device to be mounted on the edge of a partially raised rear window of a vehicle so equipped. The device can be collapsed into a compact configuration for easy storage by folding the three parts on top of each other. The above described device can only be attached to a towing vehicle having an edge available for mounting but could not be mounted on a flat surface horizontal or vertical.

U.S. Pat. No. 4,905,376 discloses another device providing a visual aid when connecting a towing vehicle to a trailer. This device is of a much more complicated construction in that it involves clamps that are attached to the tail gate of a pickup truck. A convex mirror is attached to carrying bars and is frictionally mounted between the spring clamps. The mirror itself is movably mounted on the bars. There is no disclosure that this device can be mounted on any other type of towing vehicle. This same patent discloses another device providing a visual aid when connecting a towing vehicle to a trailer. This device uses the same complicated structure except that instead of spring clamps it uses magnets to attach the device to the trunk lid of a passenger vehicle. Further, these devices cannot conveniently be used again on the same vehicle because there is no way to mark and color code the device once it is properly aligned without performing the previous alignment procedures, nor can these devices be collapsed into a compact configuration for easy handling and storage.

U.S. Pat. No. 5,309,289 discloses a further visual aid for connecting a towing vehicle to a trailer. This device is not to be mounted on the towing vehicle at all but is permanently attached to the tongue of the trailer itself. This is not the object of this invention.

3. OBJECTS OF THE INVENTION

The object of the invention is to construct a very simple but effective and versatile device that can be constructed at a low cost. It is constructed in such a manner that the same device can be used on different types of towing vehicles such as a pickup truck having a tailgate, a pickup truck having an attached rear bed cover with rear windows that are transparent, a van having one or two rear doors with windows, a passenger car having a trunk lid or a passenger station wagon with a movable rear window or any other vehicle or equipment that can be connected to any type of trailer or equipment. It can be used on either one of the above mentioned vehicles and no modifications to the device have to be made except for the placement on the vehicle and the visual line adjustment. The device can also be collapsed into a flat and compact configuration for easy handling and storage.

4. SUMMARY OF THE INVENTION

The present invention involves a device as a detachable alignment aid for connecting a towing vehicle with a trailer to be hitched to any of the vehicles mentioned above. The device is basically constructed of three components which are connected to each other in such a manner, that when collapsed, they will not stack on top of each other but will assume a position wherein at least two components are substantially nestled within or adjacent to the other of the components so that an overall flat configuration is obtained which can easily be handled and stored in its original packing carton under the seat of a vehicle or other convenient places.

The device has a mounting system which is constructed in such a manner so that it can be mounted with ease at the rear of any of the towing vehicles mentioned above without having to make any modifications to the device or the vehicle. The components move relative to each other to an adjusted position and when mounted on a vehicle, they provide a visual aid for the driver of the towing vehicle so that the driver can easily observe the relative positions of the ball of the hitch of the towing vehicle and the socket on the tongue of the trailer.

In one embodiment, the three components are made from a flat piece of material that may consist of plastic, metal or wood, etc. When the device is seen in an upright position, the top and bottom components are connected to the base component by means of hinges so that they may swing in or out of a flat plane into other adjusted positions. The top component is provided with a mirror, preferably a convex mirror, while the bottom component is provided with means for attaching the device to a vehicle. For storage, all three components will again collapse within each other for easy handling and storage.

In a second embodiment, at least two components are made from rods or other shapes of material that may consist of plastic, metal or wood and are preferably hollow in their interiors. The rods are formed into U-shaped frames. When seen in an upright position, there are top and bottom U-shaped components which are hinged together with friction hinges at the ends of the legs of the "U" so that they may swing out of a flat plane into other adjusted positions. The top component is provided with a convex mirror which is hinged to the bottom of the "U" by way of a spring tension clip having frictional characteristics there between so that the mirror may move out of a nestled and flat position into other adjusted positions and remain there because of the above noted friction. The bottom component is provided with suction cups so that the device can be attached to the rear of a towing vehicle. The bottom component is also attached to the base component by way of spring tension clips creating friction there between. for storage, all three components may be collapsed within each other into a nestled and flat configuration.

In still another embodiment, the base component consists of a rectangular frame. The frame is made of rods and may consist of plastic, metal or any other material and the rods are preferably hollow in their interior. When the device is seen in an upright position, there is a bottom component in the shape of a rectangular plate which is connected at one of its edges to the rectangular component by way of a spring tension clip. The bottom component may nestle within the base frame but may swing into other adjusted positions and remain there because of the friction within the spring tension clip. The plate may be a plastic, metal or any other material. There is a top component having a convex mirror thereon or the mirror itself can be the top component. In any event, the top component is connected to another side of the base frame by way of a tension clip. The top component may nestle within the base component in a flat plane but may swing into any other adjusted position and remain there because of the friction within the spring tension clip. For storage, all three components will collapse within each other into a flat configuration for easy handling and storage.

BRIEF DESCRIPTION OF THE DRAWING

FIG. 7 shows another embodiment of the invention by using rectangularly shaped components FIG. 8 shows the components of FIG. 7 in angulated positions.

FIG. 9 shows a hinge being frictionally connected to a rod of the rectangular frame shape FIG. 9a shows the components of FIG. 9 in a cross-section.

FIG. 10 shows another method of creating friction between the rectangular rod and the components.

FIG. 10a shows the components of FIG. 10 in a cross-section.

FIG. 11 shows yet another method of creating friction between the rectangular rod and the components.

FIG. 11a shows the components of FIG. 11 in a cross-section

FIG. 12 shows a different arrangement of forming a rectangular frame.

FIG. 13 shows the components of FIG. 12 in angulated positions.

FIGS. 14 and 15 show the flat surfaces of half ball hinges having ridges and grooves thereon.

FIG. 16 shows the two halfs of a ball hinge opposed to each other.

FIGS. 17 and 17A–17C show another rectangular frame with one of the sides having been omitted.

FIG. 18 shows the components of FIG. 17 in angulated positions.

DETAILED DESCRIPTION OF THE INVENTION

Figure 1:
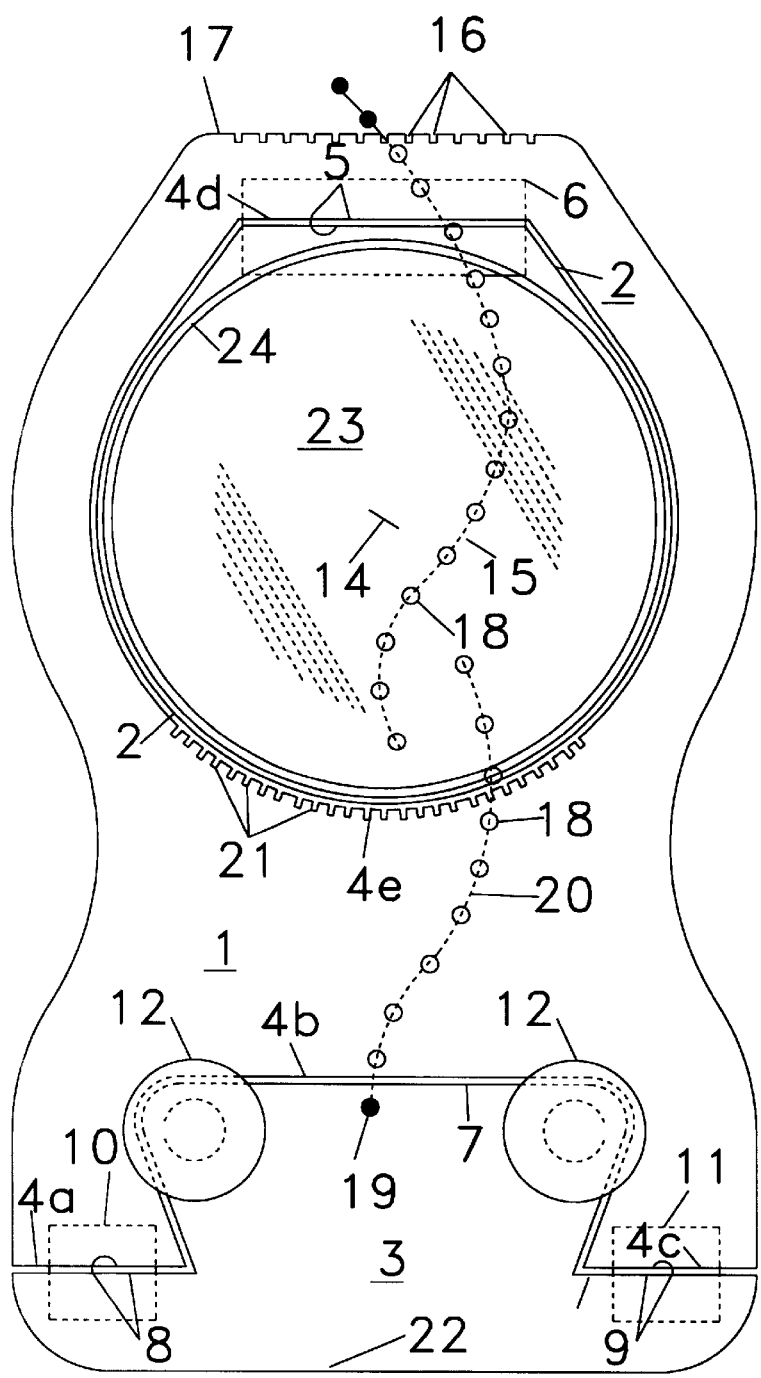
FIG. 1 is a planar view of the invention.
Figure 2:
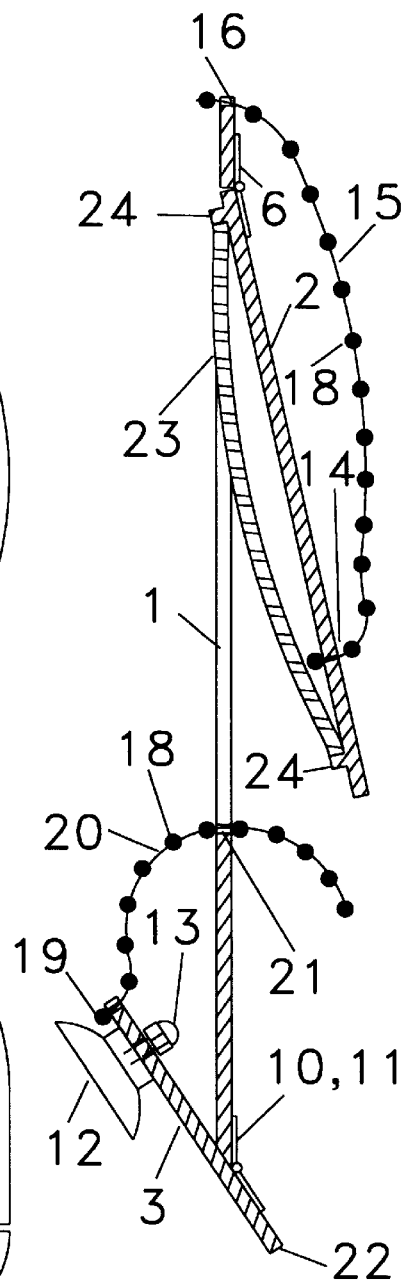
FIG. 2 is a side view of the invention showing two of the components in an angulated position.
Figure 3:
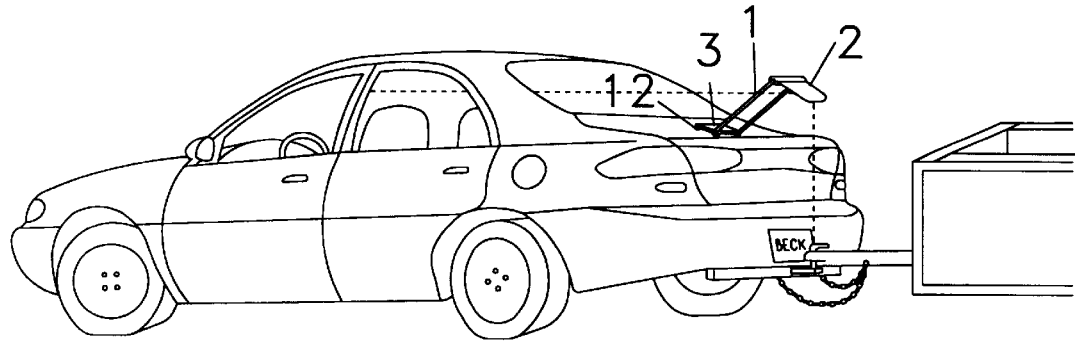
FIG. 3 shows the invention attached on a trunk lid of a passenger car.
Figure 4:
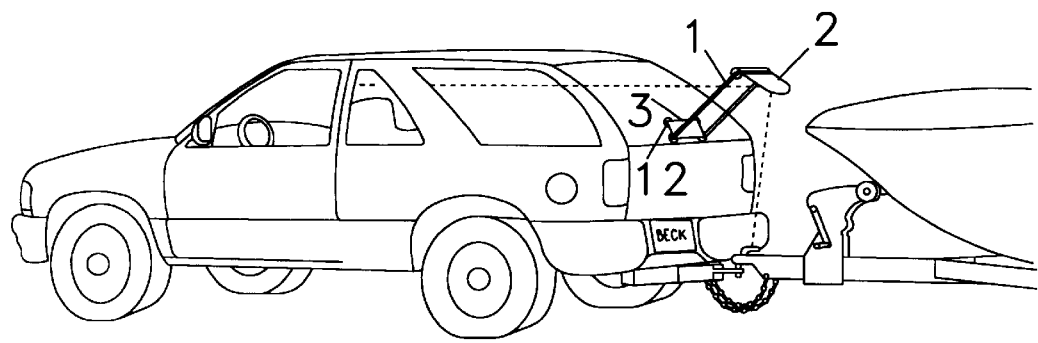
FIG. 4 shows the invention attached to the rear of a van.
Figure 5:
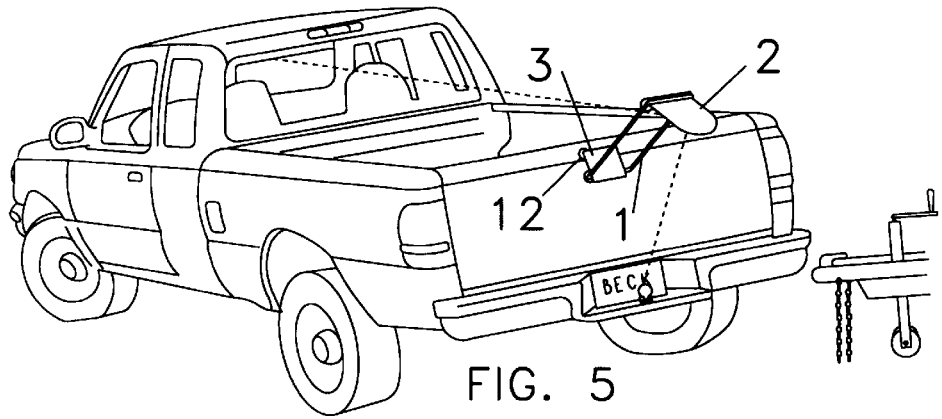
FIG. 5 shows the invention attached to the tail gate of a pickup truck.

FIG. 1 shows the present invention in a planar view having three components 1, 2 and 3. Component 1 may be considered the base component while 2 and 3 are the other two components. When the device is in an upright position, 2 would be a top component and 3 would be the bottom component. All three components are cut, stamped or otherwise obtained from a flat and rigid piece of material or they may be formed by injection molding. The material itself should be light weight and could consist of various plastics or metal such as aluminum or tin properly strengthened by upturned edges or ridges or grooves if necessary. The general outer outline of component 1 may take the shape as shown in FIG. 1 but may assume any shape for the invention to operate as intended. The inner outline 4a, 4b, 4c and 4d of component 1 should conform to and be parallel with the outer outline of components 2 and 3. The outer outline of component 1 in FIG. 1 may take the shape as shown but it could take any other shape as long as a straight edge shown at 5 is included because at this edge component 2 is re-connected to component 1 by way of a hinge 6. Because of this hinge 6, component 2 may swing out of the plane of component 1, as is shown in FIG. 2, but it may move back into the flat plane of component 1 whereby it is nestled therein. Component 3 may have the outline 7 as shown but could also be of other shapes as long as at least two straight edges 8 and 9 are included because at these two edges, the component 3 will be re-connected to component 1 by way of two hinges 10 and 11. The hinges 6, 10 and 11 may be of convential construction and could be mechanical types with a pintle, plastic or metal hinges, pressure or glued tapes or extruded "living hinges". Because of these two hinges 10 and 11, the component 3 may swing out of the plane of component 1, as is shown in FIG. 2. However, component 3 may move back into the plane whereby it is nestled within component 1. Component 3 in FIG. 1 also shows two suction cups 12 which are the means for attaching the device to the rear of any of the types of vehicles mentioned above. It should be understood that magnets could also be used instead of suction cups. The suction cups 12 could be rigidly attached to component 3 by bolts 13 or any other fastening systems. However, it has been found advantageous that the cups 12 be attached to component 3 with play by bolts 13 to allow for movements relative thereto for reasons to be explained later. When in use and the device is mounted in an upright position on the rear of a vehicle, the three components 1, 2 and 3 assume an angulated position relative to each other which must be maintained so that the driver has a correct line of vision to the parts of the hitch. This is accomplished by using arresting devices 14, 15, 16, 18, 19, 20 and 21 all shown in FIG. 1 and some in FIG. 2. A multiple of notches 16 are provided in the straight edge 17 of component 1. Also a multiple of notches 21 are provided in the curved interior bottom edge 4e of component 1. At the bottom 14 of component 2, a string 15 having beads 18 thereon is attached and when any section of the beaded string is placed into any one of the notches 16 of component 1, the beads 18 will arrest the two components 1 and 2 in their angulated positions. at 19 of component 3, a string 20 having beads 18 thereon is attached and when any section of the beaded string 20 is placed into any one of the notches 21 of component 1, the beads 18 will arrest the two components 1 and 3 in their angulated position.

The operation of this device is best explained by reference to FIG. 2. Initially, the visual aid device is simply attached by its suction cups 12 to the rear of a towing vehicle in an upright vertical position. Because of its gravity and because of the movement of the bolts 13 in the holes in component 3, which established a play there between, the edge 22 will settle and rest against the vehicle to stabilize the device. To keep the component 1 in an angulated position relative to component 3, a section of the beaded string is placed into any one of the notches 21 to arrest the same in that position. Thereafter, component 2 having a convex mirror 23 attached thereto swings out of the plane of component 1 into an angulated position as shown in FIG. 2 and is arrested in that position by placing a section of the beaded string 15 into any one of the notches 16 on component 1. The first time when the device is used, the angular adjustments between the components have to be made on a trial and error method until the correct line of sight to the hitch parts has been established. Thereafter, a color mark is placed on the particular section of the beaded strings 15 and 20 and the respective notches 16 and 21. It should be noted at this time that other arresting devices may be used instead of strings with beads such as ball chains, for example. It is now clear that the same visual aid device is used in combination with the same vehicle, a mere matching of the corresponding color marks will properly and quickly establish the angulated positions of the components relative to each other and the device can quickly be attached to the rear of the towing vehicle and it is ready for its intended use. The same device can also be used on a different kind of vehicle such as the trunk of a passenger car, for example. Initially, again the correct angular adjustments have to be made by the above noted trial and error method until the correct line of sight has been established. Thereafter, a color mark, different from the first one, is placed on the particular section of the beaded strings 15 and 20 and the corresponding notches 16 and 21. It is now clear that the very same device can be used on different types of vehicles as long as the respective color coding marks are observed.

Figure 6:
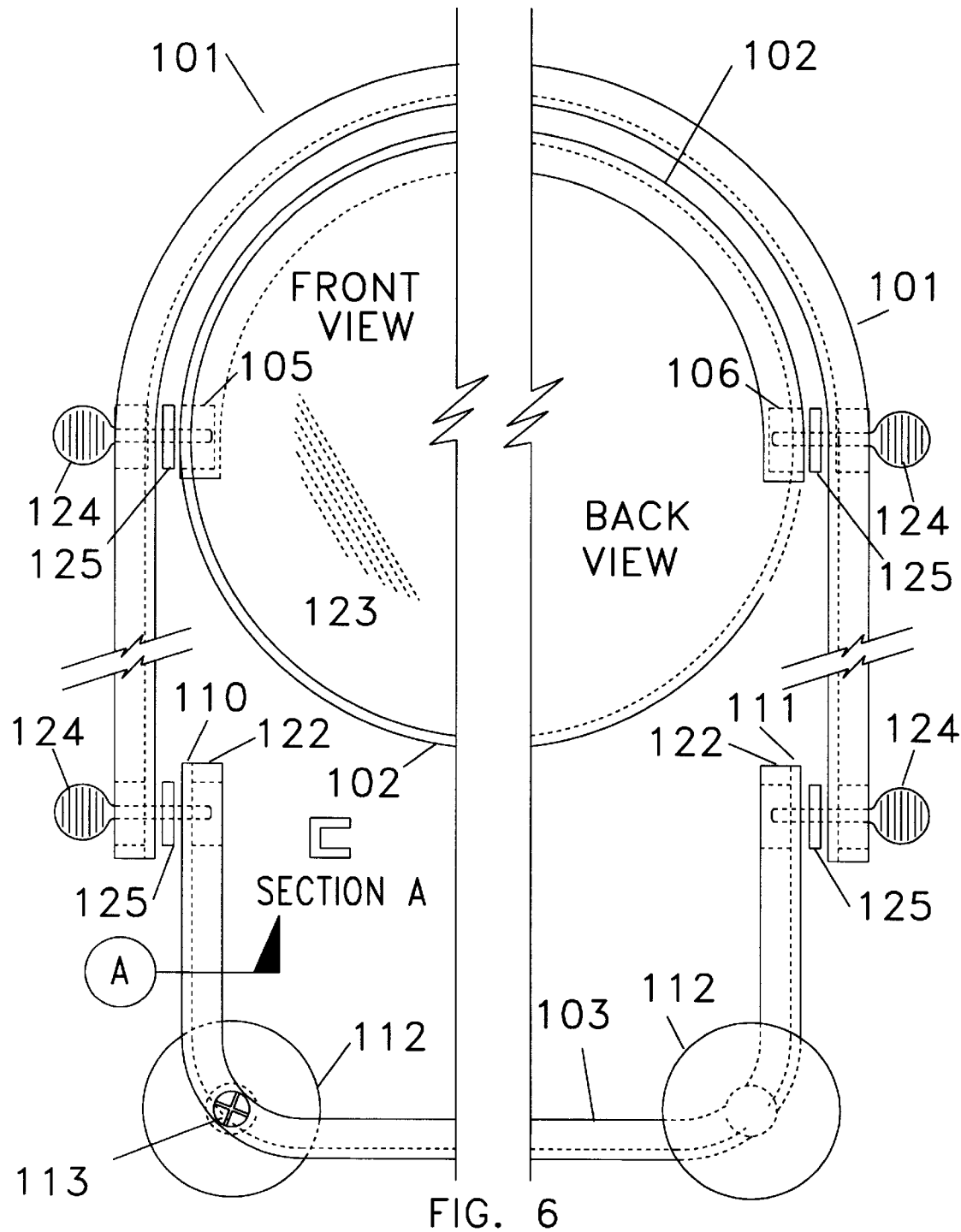
FIG. 6 shows a different embodiment of the invention by using U-shaped components.

In FIG. 6, a second embodiment, the elements as found and explained in FIG. 1 have been identified but with the prefix numeral "1". Thus, the three components are identified as 101, 102 and 103. Component 101 should be considered the base component and it has a U-shape. At the free ends of the legs of the U-shape one of the other two components 103 is hingedly connected by way of friction hinges 110 and 111. Thereby, the Component 103 may swing out of the plane of component 101 into an angulated position and thereafter move back into the component and stay nestled therein in a flat configuration. Two suction cups 112 are attached which constitute the means for connecting to a vehicle. As explained above, the cups could be rigidly attached to component 103 or with play. When attached with play, the edge 122 of component 103 will be instrumental in stabilizing the device once it is attached to a vehicle, as has been explained above. The second of the other two components 102 is hingedly attached to the base component 101 by way of spring tension clips 105, 106. The edge of the convex mirror 123 could directly be attached to the spring clips, to a plate having the mirror attached thereto or another U-shaped component with the convex mirror mounted thereon. The spring tension clips 105 and 106 act as arresting means to arrest the adjustment of the mirror once a correct line of vision has been established. The operation of the device in FIG. 6 will now be described by also making reference to FIG. 6. The suction cups 112 are attached to a somewhat vertical surface of the towing vehicle. The device is now in an upright position and because of gravity and the play of the bolts 113 in frame 103, the edge 122 will settle against the surface of the vehicle. In order to now establish the correct line of vision by the above mentioned trial and error method, frames 101 and 103 are now moved into their proper position and arrested in that position by the friction prevailing in the spring tension clips 105 and 106 and by the friction created in friction hinges 110 and 111 by tightening the thumb screws 124. Of course, other friction hinges could be used such as snap hinges etc. Once a correct line of vision has been established, the various rotational positions of the components relative to each other can be color coded as is shown in FIG. 8. The same procedure is to be used when the device is attached to a different type of vehicle whereby a different color is being used for that particular vehicle to identify the rotational positions FIG. 7 shows a third embodiment of the visual aid device. In this Fig., the basic parts of FIG. 1 have been identified by using the numerical prefix "2". Thus, the base component is shown as 201 and in this embodiment consists of a rectangular frame 201. The rod from which the frame is made could be made of any kind of material as identified above with reference to the U-shaped components. However, the sections of the frame located at the short sides of the rectangle should be rounded for the reasons to be explained later. When the device is placed in an upright position, there is an upper component 202 which could be the convex mirror 223 itself or it could be a plate having the mirror attached thereto. Component 202 is attached to component 201 by way of a spring tension formation 211. The frame 201 is rounded at this section because the spring tension formation 211 should be able to rotate around this section but with friction so that the components will stay arrested to each other in certain adjusted positions. The component 203 in FIG. 7 consists of a plate which is attached to the base component 201 by way of another spring tension formation 211a which is formed at the edge of the plate and in turn itself is clipped around another rounded section of the other short side of the rectangle 201 so as to rotate there around but with friction so that the two components can be arrested in certain adjusted positions relative to each other. The spring tension formations are shown in FIG. 8 as 211 and 211a. When this device is not in use, the two components 202 and 203 are collapsed into the base component 201 and are nestled therein in a flat configuration. This device is attached to a rear surface of a towing vehicle in the same manner as was explained with reference to the other two embodiments. The correct line of vision is established by the above noted trial and error method and color coding is made by adding color marks 200 and 200a on the relative positions of the components between the spring tension formations and the rounded sections around which they rotate on one side of the formations and for a different vehicle adjustment on the other side of the formations by using a different color. Again, there is a choice of rigidly fastening the suction cups to the component 203 by bolts 213 or the bolts having a play within the plate for reasons already explained above. In the latter case, the edge 222 rests against the surface of the vehicle as a stabilizing force.

The following FIGS. 9–11 will show various ways of frictionally connecting the components to each other. The different ways are shown with reference to the lower component 203 but they are equally applicable to the other upper component as well. In FIG. 9, there is shown a clip 211 which is fastened to the component 203 and it is pretensioned so that the clip will grasp the rod 201 and thereby create the necessary friction. FIG. 9a shows a cross section once the parts are assembled. FIG. 10 shows another way of creating friction between the basic component 201 and the lower component 203. In this case, the component 203 has a rounded formation 34 with alternating ridges 30 and grooves 30a on its interior and the rod 201 similarly has alternating ridges 30 and grooves 30a which when the components are assembled will create friction of their own. However, in this embodiment the force of friction can be controlled or adjusted. To this end, component 203 is provided with a circumferential slot 25 and the rod 201 is provided with a threaded bore 29. A bolt 26 passes through the slot 25 and is threaded into the bore 29. Under the head of the bolt 26 a tension spring 27 is placed which presses against a washer 28. Thus, by turning the bolt 26 in either direction. more or less tension is applied between the component 203 and the rod 201. This then results in an adjustable friction. FIG. 10a shows the arrangement of the different parts in their cross section. The embodiment shown in FIG. 11 is similar to FIGS. 10 and 10a including the rounded formation 34 and the ridges 30 and 30a, however, the additional friction is created in a different way, that is, a compression clip 31 is provided along the length of the rounded formation to compress the open mouth of the rounded formation. The spring clip 31 has two bent edges 31a and 31b which are received in a groove 32 and over a lip 33 respectively. In this manner, the mouth of the rounded formation cannot widen when the components are rotated relative to each other. Again it is noted that color coded marks appear at 200a as was explained above.

Turning now to FIGS. 12 and 13, there is shown still another embodiment of the invention. The same basic components will be identified but now having a prefix numeral "3". Thus, the basic component, again a rectangular frame 301 has two movable components 302 and 303 hinged thereto so that they can nestle within each other. The component 302 can be a flat piece of material. This component carries the convex mirror 323. Also, the component 303 has the suction cups 312 mounted thereon by screws or bolts 313. As has been established above, the relative angulated positions of the components have to be adjustable but should be arrestable by friction once the adjusted positions have been reached.

In this embodiment the necessary friction is obtained by using half ball hinges shown as 35 and 36. The diameter surfaces that face each other are provided with ridges 35a and grooves 36b, respectively, FIGS. 14 to 16. The two half balls 35 and 36 remain centered relative to each other by the use of a protruding round cylinder 37 which is being received in a complimentary holes 38. The two longitudinal rods 301a and 301b, that form the rectangular frame, are initially somewhat bowed outwardly from a straight line and will assume a straight line when the protruding round cylinders 37 are inserted in their respective holes 38. This will create, a frictional tension within the half ball hinges 35 and 36 by way of a force-fit. Again it is noted that color coding marks 300 and 300a can be used to identify the angulated positions between the components. A final embodiment is shown in FIGS. 17 and 18. In this embodiment the essential base parts are shown by the use of the prefix numeral "4". Thus, the rectangular base component 401 is shown but with one of the longitudinal rods having been omitted. This particular structure lends itself well for ease of construction because the various parts can be slid on to each other during assembly. To this end, when the rectangular three sided frame is being molded, ridges 45 are being created on the inner end of the rod 402, while grooves 48 are being created at the outer end of the rod 46. The rod 46 tapers from the ridge 45 to the groove 48. Both components 402 and 403 are injection molded such that substantial circular hinges or clips 42 and 43 are obtained having expansion gaps 42a and 43a, respectively. Thus, when the components 402 or 403 are slid over their respective short rods 46, the increasing diameter of the tapered rod will operate on the expansion gaps 42a and 43a to expand the same until ridges 45 and 47 snap into grooves 44 and 48, respectively. This then results in that all components are in a fixed position with friction there between to hold the components in their angulated positions. The angulated positions can again be identified by the color coding 400 and 400a as was explained above.

What we claim is:

1. A visual alignment aid device for connecting a ball of a hitch on a towing vehicle to a socket on a tongue of a trailer comprising; at least three components with a first component being a base component and a second one of said components having a mirror attached thereon and a third one of said components having means thereon adapted for attaching said third component to a rear of said vehicle, all three components are connected to each other by hinges to enable said components to move into angulated positions relative to each other to establish a correct line of vision between a driver of said vehicle and said ball and socket, means for arresting said components in their angulated positions, said second and said third components being collapsible entirely into said base component to nestle therein in a substantially flat configuration, wherein said hinges include color coding marks to indicate the relative rotational positions between said components.

2. The visual alignment aid device of claim 1, wherein the means for attaching to a vehicle are suction cups.

3. The visual alignment aid device of claim 1, wherein the means for attaching are magnets.

4. The visual alignment aid device of claim 1, wherein the means for arresting are strings having beads thereon which are each attached at one of their ends to said other two components and sections of said strings are received in notches provided on said base component.

5. The visual alignment aid device of claim 1, wherein the means for arresting is the provision of friction between said hinges and said components.

6. The visual alignment aid device of claim 5, wherein the friction is provided by using rotatable hinges including friction material therein.

7. The visual alignment aid device of claim 5, wherein the friction is provided by using spring tension clips being rotatable around sections of said components.

8. The visual alignment aid device of claim 1, wherein all of said components are made of flat material.

9. The visual alignment aid device of claim 1, wherein at least two of said components have a U-shape.

10. The visual alignment aid device of claim 7, wherein the base component is a rectangular frame and said spring tension clips rotate each around one of the shorter sides of said rectangular frame.

11. The visual alignment aid device of claim 5, wherein said means for arresting are spring tension clips which are integral with said second and third components.

12. The visual alignment aid device of claim 11, including means for adjusting the friction between said hinges.

* * * * *